Figure 1:
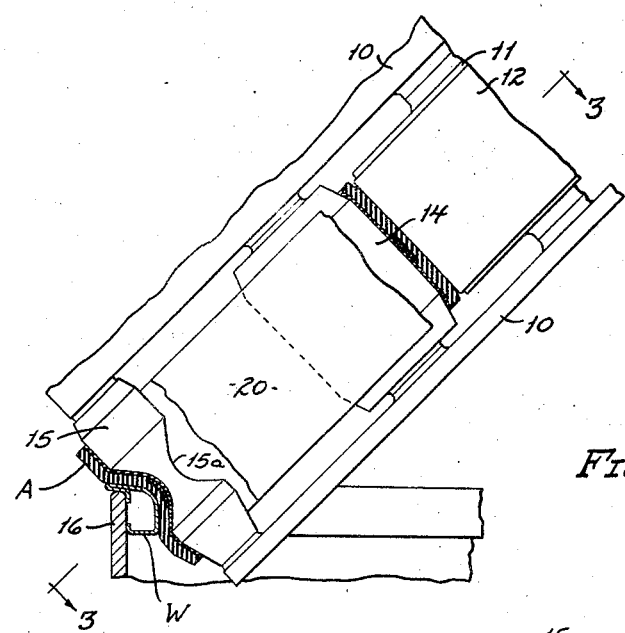

March 19, 1940.  L. V. CASTO ET AL  2,193,899
METHOD OF MAKING TRANSFER MEMBERS
Filed Aug. 27, 1937   3 Sheets-Sheet 1

INVENTORS
LLOYD V. CASTO, GUIDO VON WEBERN,
and EDWARD W. HAMANT
BY Bates, Golrick, & Teare
ATTORNEYS March 19, 1940.　　L. V. CASTO ET AL　　2,193,899
METHOD OF MAKING TRANSFER MEMBERS
Filed Aug. 27, 1937　　3 Sheets-Sheet 2

INVENTORS
LLOYD V. CASTO, GUIDO VON WEBERN,
BY　　and EDWARD W. HAMANT.
Bates, Golrick & Teare
ATTORNEYS March 19, 1940. L. V. CASTO ET AL 2,193,899
METHOD OF MAKING TRANSFER MEMBERS
Filed Aug. 27, 1937 3 Sheets-Sheet 3

INVENTORS
LLOYD V. CASTO, GUIDO VON WEBERN,
BY  and EDWARD W. HAMANT
ATTORNEYS

Patented Mar. 19, 1940

2,193,899

UNITED STATES PATENT OFFICE 2,193,899

METHOD OF MAKING TRANSFER MEMBERS

Lloyd V. Casto, Detroit, Mich., and Guido von Webern and Edward W. Hamant, Dayton, Ohio, assignors to Oxford Varnish Corporation, Detroit, Mich., a corporation of Michigan Application August 27, 1937, Serial No. 161,328

13 Claims. (Cl. 154—4)

This invention relates to a method of making a transfer member. More particularly, the present invention is concerned with a method of making an offset printing blanket in the form of a continuous, flexible loop. The transfer member or belt, itself, forms the subject matter of my co-pending application for Letters Patent, Serial No. 215,662, filed June 24, 1938, now Patent No. 2,169,221.

This invention is a continuation, in part, of co-pending applications for Letters Patent Serial Nos. 38,358, filed August 29, 1935, and Serial No. 108,698, filed November 2, 1936, Patent Nos. 2,096,730 and 2,096,731, respectively.

In decorating articles of manufacture, and especially in the application of designs simulating wood-grain and other natural objects to articles of manufacture by printing processes, many difficulties have been encountered when the surfaces to be decorated deviate from a common plane, either in a transverse direction or in a lineal direction within the plane. Such decorations are generally accomplished by the use of offset printing processes which utilize, as a pattern, a photo-engraved printing plate, made in any well-known manner. However, the patterns or such printing plates are generally flat or developed on cylindrical surfaces. Hence, when the surface to be decorated deviates from a common plane, the transfer member must coact with the planular surfaces of the pattern to remove ink therefrom, and then coact with the non-planular surface of the article to be decorated to transfer such ink thereto. In some instances it has been found to utilize a mechanism having a continuous flexible looped band or web as a transfer member. Examples of such mechanisms are shown and claimed in Patent No. 2,069,789, and the patent applications heretofore referred to, all of which are assigned to the assignee of the present invention. In such patent and patent applications the transfer web or belt comprises a flexible, continuous belt, which is looped about a pair of spaced rollers. One of these rollers has a true cylindrical surface, and supports the belt for rolling contact with the cylindrical pattern, while the other of these rollers is grooved or has an otherwise configured or deformed surface approaching a surface complementary relative to the contour of the work surface to be decorated.

The transfer belt or web mentioned above must, of course, be flexible, and the pattern and work-contacting surfaces must be formed of a material which will remove the ink or paste from the image of the pattern and transfer such image to the work. Generally, glue and glycerin compounds, which are well known in the art, are used for this purpose. These compounds lack the strength required to be used as a transfer member without a continuous support or base, and particularly when a substantial configuring force or pressure is applied to the printing portion of the belt. Hence, the general object of the present invention is the provision of a method of making a transfer member, or belt, in such a manner that the transfer material will be adequately supported by a flexible supporting band or loop.

When the surface of one roller supporting the transfer belt deviates from a true cylindrical surface, additional difficulties are encountered. In such instances, the belt must conform to the deformation of such roller, either as a result of the pressure on the work or by the tension of the belt between the supporting rollers, or the belt may be preformed to coact with the deformed roller and stretched by the tension of the belt between the two rollers to present a substantially flat surface to the pattern plate or cylinder. In any of these instances, the transfer member is constantly flexing to present a flat, planular surface to the pattern and a non-planular or deformed surface to the work. Therefore, a further object of the present invention is to provide method of making a transfer belt which will flex, to permit the deformation above mentioned at comparatively high speeds of travel of the belt, and with as little surface distortion as possible, and thereby accurately transfer the design to the work without blurring or other disadvantageous results.

Accurate reproductions of the design or pattern on the work are essential. When the pattern comprises a substantially flat or cylindrical surface, and the work comprises a deformed surface, the condition of the structure of that portion of the offset blanket that contacts the work and that portion of the blanket that contacts the pattern should be such that the distortion of the design carried thereby is minimized. A further object of the present invention, therefore, is to provide a method of making a transfer belt which will provide a belt having such surface characteristics as will accurately transfer the design. This object is attained by providing and securing a resilient composition surface, to an elastic base in such a manner that the base will be normally held in tension by the composition coating and the composition will be normally held in compression by the base. Thus, the belt may be stretched or looped about a pair of rollers, one having a true cylindrical surface and being large in comparison with the other roller, which is provided with a deformed surface, with the surface of the composition coating at the extreme end of the belt adjacent the larger roller in a substantially normal or non-stretched condition, and the surface of the composition adjacent the other looped end of the belt is abnormal or in tension lengthwise of the belt, thus slightly decreasing the width of the surface at such point. Thus, when the composition is forced fully into the deformation of the deformed roller, the belt will be tensioned transversely of the belt (axially of the roller), increasing its surface to substantially its original width. The effect may be best illustrated by way of an example. Let us assume the design comprises a series of equi-spaced lines extending circumferentially about the pattern cylinder. Ink from such lines, when transferred to the normal surface of the transfer belt, will be spaced identical with the lines on the pattern, and will extend lengthwise of the belt. As these lines are drawn about the deformed roller, they will come closer together where the roller is undercut, the belt being stretched lengthwise to bring the belt partially into the annular depression in such roller. When, however, the work is engaged by a rolling action and the belt pressed fully into the annular depression in the roller, the axial stretching of the belt restores the spacing of the pattern lines, thus accurately reproducing the pattern so that the lines thereof are equi-spaced about its surface. The formation of the belt to accomplish the above, is effected by applying the composition in a normal or non-tensioned state to a pre-stretched elastic base, the elasticity of which is sufficient to enable the finished belt to be stretched to a substantially normal condition of the pattern and be looped about the deformed roll without completely, still partially entering the deformation therein.

Figure 2:
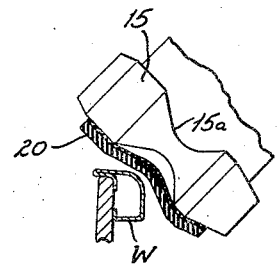
Figure 3:
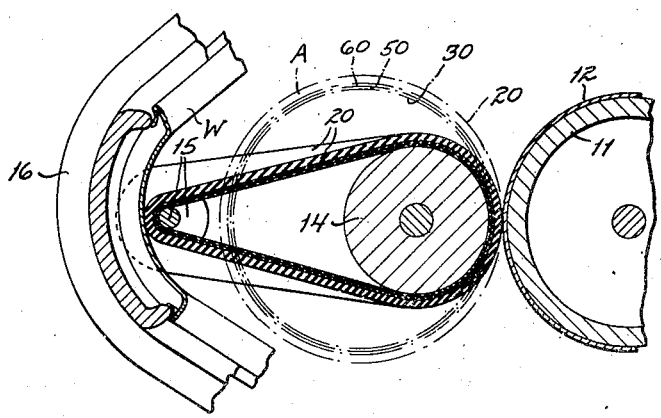
Figure 4:
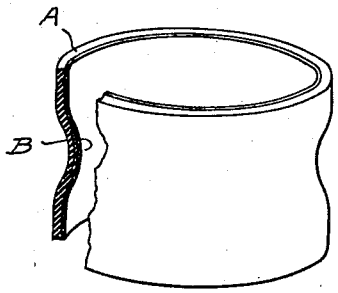
Figure 5:
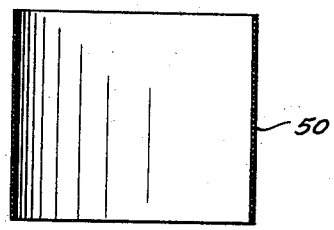
Figure 7:
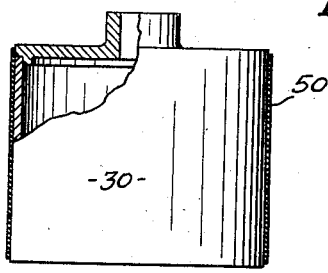
Figures 6, 8:
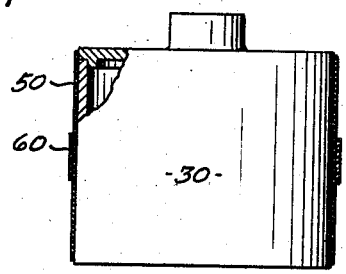
Figure 9:
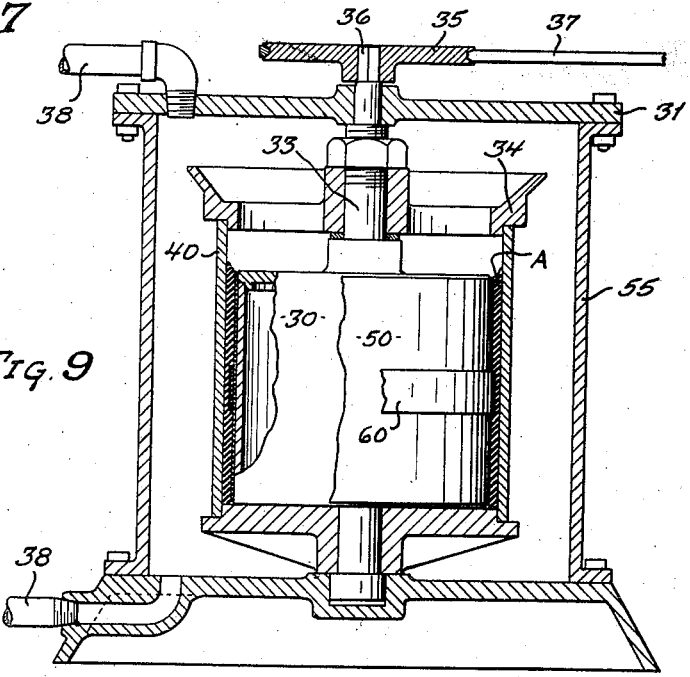
Figure 15:
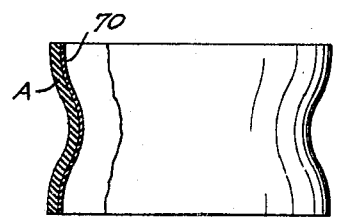

In the drawings, Fig. 1 illustrates a portion of a decorating mechanism utilizing an offset or transfer belt, constructed and used in accordance with the present invention, the belt being partially broken away to more clearly illustrate the contour of the belt-supporting rollers and shape deformation of the belt when coacting with the pattern and the work respectively; Fig. 2 is a fragmentary view, similar to Fig. 1, but illustrating the relative surface contours of the belt, the pattern, and the pattern supporting roller when the decorating mechanism and work have been separated by a relative separating movement; Fig. 3 is a sectional view of the decorating mechanism, the transfer belt, and the workpiece, the plane of the section being indicated by the lines 3—3 on Fig. 1; Fig. 4 is a perspective view of the transfer belt, removed from the decorating mechanism, a portion of the belt being broken away to more clearly illustrate the internal construction thereof; Figs. 5 and 6 are of vertical sections illustrating elements which go to make up the belt; Figs. 7 and 8 illustrate such elements in position upon a forming mandrel; Fig. 9 illustrates the forming mandrel in position in a centrifugal machine, in which the coating or transfer surface material is applied to the belt; Figs. 10 to 14, inclusive, are diagrams illustrating the various steps used in utilizing a modified form of elements for the formation of the belt; Fig. 15 is a sectional view, illustrating the belt made by the modified method.

Referring now to Figs. 1 to 3, inclusive, the improved transfer member or web with which this invention is especially concerned for the purpose of illustration, is shown in use in a decorating mechanism of the type shown in copending application heretofore referred to, and reference to such applications may be had for a more complete disclosure of this mechanism. The drawings of the present application show a portion of a frame 10, which rotatably supports a pattern roll 11, provided with a cylindrical intaglio printing plate or cylinder 12, having a continuous design about its periphery. Also, rotatably mounted in the frame 10 are a pair of spaced rollers 14 and 15. The larger roller 14 of the pair is positioned adjacent the pattern roll, while the smaller roller 15 is positioned adjacent a work support 16. The work is indicated at W, and may comprise, as shown, a metallic frame, such as an automotive window frame. However, many types and kinds of work may be decorated by my improved offset member, as occasion may demand.

In operation, the pattern roll 11 and the roller 15 are positively rotated, causing ink or graining paste, which is applied to the pattern roll in the usual manner, to be removed from the pattern by the transfer or offset belt 20, and transferred by such belt to the work W, which rests on the workholder 16. Generally, the workholder is progressed lineally, so that the work coacts with that portion of the transfer web 20, which lies adjacent thereto, with a true rolling action, thereby accurately transferring the design in color from the pattern to the work.

As will be seen from the above description, it is preferable that the transfer belt be flexible, resilient and yielding. Flexible, because it must pass through from arcuate formation around the rollers into a straight line formation for those portions of the belt between the rollers; resilient, because the roller 15 is deformed, as at 15a (Fig. 1), whereas the roller 14 has a flat, cylindrical surface, thus the offset web or belt must yield so as to enter the deformed surface of the roll 15, and yet lay flat along the surface of the roller 14.

It has been found advantageous in some instances to provide a transfer belt which, when tensioned and out of contact with the work W, assumes a position relative thereto substantially as shown in Fig. 2. In this figure the belt is shown as being under such tension as will draw the belt partially into the recess 15a, formed in the roll 15, but not to such an extent as to fully coact with such recess of the roll until pressure has been brought against the belt by contact with the work W. Under such conditions, the surface of the transfer material is under substantially no tension.

The preferred belt is formed by stretching an elastic band 50 about a cylindrical form generally indicated in dotted lines in Fig. 3 at 30, and applying to such stretched band a second elastic band 60, which, to encircle the first band, must be stretched to a greater extent than the first band is stretched. To these stretched bands a coating of transfer material A is applied. This coating is unstretched when applied. Hence, when the belt is removed from the mandrel or cylinder 30, and stretched between the rollers 14 and 15, the transfer material is in a substantially normal condition, (neither tensioned or compressed), where it passes around the relatively large diametered roller 14 and slightly compressed where it passes about the smaller, deformed roller 15. The amount of this compression is such that it will be substantially neutralized by the axial or transverse stretching caused by the printing pressure between the belt and the work.

To provide a transfer belt to function as above described, it has been found advantageous to so form the belt that, when in its normal shape, a cross-section through the belt at any point is substantially the same as the cross-section through the belt shown in Fig. 2—that is, the deformation of the belt from a straight line is less than the deformation of the roll 13 from a straight line surface. Such a belt is shown in Fig. 4.

As heretofore mentioned, the offset web or belt should be resilient and flexible, and, the material required to accurately transfer a design from the pattern to the work, requires the use of a material which is of such a nature that it will not readily support itself when used as set out above. Therefore, such transfer material, which is generally indicated at A in the drawings, is provided with a suitable flexible base B. For the preferred form, this base is elastic, although for some purposes this is not essential. Among the materials that can be used for this purpose are rubber and latex fabrics.

In the preferred method of making the improved transfer belt, a cylindrical sleeve or band 50 of elastic material is cut to the desired height. This sleeve is preferably cylindrical in form, and is placed about a mandrel or cylinder 30. To form the recess or deformation in the belt, a second sleeve 60 of elastic material, which is smaller in diameter, and somewhat narrower than the sleeve 50, as indicated by an inspection of Figs. 5 and 6, is then stretched and superposed on the band 50, carried by the mandrel 30. This sleeve 60 is of such a normal diameter that it is stretched to a greater extent than the sleeve 50 in positioning it thereon. The band 60 may, if desired, be secured to the band 50 by any well known adhesive material.

The transfer material is next applied to the bands. The mandrel 30, together with the bands 50 and 60, are inserted in a mold 40, and the coating of offset material, preferably a glue and glycerin compound, is then applied. This material is liquefied, usually by heating, and poured into the mold. The material is permitted to cool or solidify and then removed from the mold and mandrel as a unit with the bands 50 and 60, thus providing the improved printing member.

It is important that the exposed surface of the transfer material to be free from irregularities, such as air pockets and the like, and that the material adjacent such surface be as dense as possible, so that the completed transfer belt have a smooth, even surface for transferring the design and thus avoid inaccuracies, blurring of the design, and the like, which otherwise might result from defects at or adjacent to the surface of the belt. To this end it is preferable that the mold 40 be rotated at comparatively high speeds, while the transfer material is still in a liquid state and such rotation continued at least during the initial chilling or solidifying period of the transfer material.

The mold may be rotated as above mentioned by a centrifugal machine of the type shown in Patents Nos. 1,720,719 and 1,832,066, issued July 16, 1929 and November 17, 1931, respectively, to the assignee of the present application, Oxford Varnish Corporation.

A suitable centrifugal machine is shown diagrammatically in the drawings of the present application as comprising a cylinder 55, having a removable cap 31, in which the mold 40 is rotatably mounted, as, for instance, on a shaft 33, to which both the mold 40 and its mandrel 30, may be secured. A suitable cap 34, secured to the top of the mold 40, maintains the mandrel in position therein.

When using the centrifugal mechanism, the liquid transfer material is poured into the space between the mandrel 30 and the internal wall of the mold 40. The cap 31 is then secured in place and a pulley 35 is secured to the square end 36 of the shaft 33 which protrudes through the cover. Thus, when the power is applied by means of a belt 37, the mold 40, together with the mandrel 30 and the transferring material contained therein, is rotated at a comparatively high speed. Suitable conduits 38 are provided so that while the composition material is being rotated at a comparatively high rate of speed, a cooling liquid may be applied to hasten the solidification of the transfer material. While the mold 32 is rotating at a comparatively high rate of speed, the heavier material of the gum composition is forced outward to the surface of the mold 40, so that the exterior surface of the transfer material will be very fine, compact and free from blow holes or other irregularities. The solidifying of the transfer material causes it to become integral with the rubber sleeves 50 and 60.

After the gum material has solidified, the mold 40 is removed from the cylinder 55 of the centrifugal machine and the mandrel 30 removed therefrom, whereupon the belt may be stripped from the mandrel, producing a continuous belt substantially as shown in Fig. 4 of the drawings.

Figure 10:
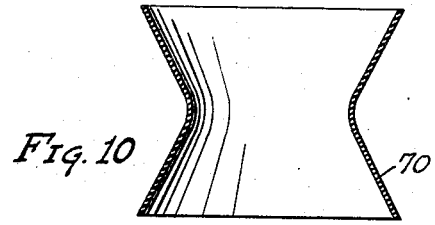
Figure 11:
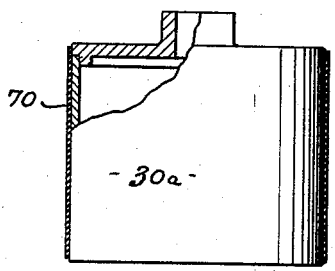

In the modified method of forming an hour-glass shaped belt, such as that heretofore described, we take a continuous hour-glass shaped or otherwise deformed sleeve or ring of rubber or other elastic material, Fig. 10, and stretch it about a true, cylindrical mandrel 30a, as shown in Fig. 11. This ring likewise is preferably smaller than its mandrel 20a, so that it must be stretched to be mounted thereon. This mandrel is then placed in a cylindrical mold 40a, and the transfer material is cast about the rubber belt, as heretofore described.

Figure 13:
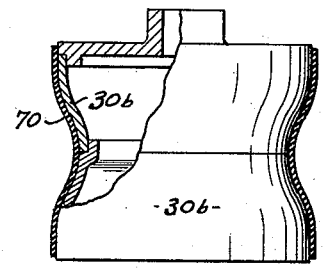
Figure 12:
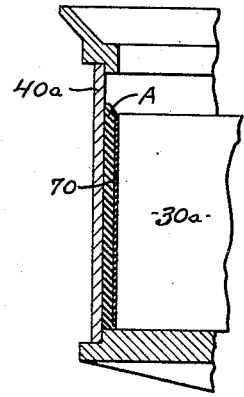
Figure 14:
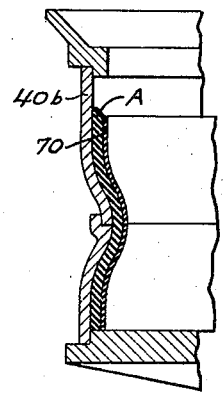

Instead of the cylindrical mandrel 30a, the deformed belt 70 may be placed on a correspondingly deformed mandrel 30b, Fig. 13. This mandrel is then positioned in a correspondingly deformed mold 40b and the transfer material cast as heretofore described. The deformation of the mandrel 30b relative to the deformation of the band may be similar to the relationship illustrated in Figs. 10 and 13. As there shown, the amount of deformation of the mandrel 30b is less than the amount of deformation of the band 70 in its normal condition. The general contours of the deformation are, however, similar. In some instances, however, it is desirable that neither the band nor mandrel be deformed or that the band and mandrel be deformed substantially the same amount.

When any of the bands 50—60 or 70 are used, their normal deformation may be greater than the expected normal deformation of the belt, thus the base will tend to maintain the belt constantly deformed. Obviously, many deformations, other than the hour-glass deformation, may be provided as demanded by the contour of the workpieces to be decorated.

From the foregoing description it will be seen that we have provided a flexible, yielding transfer belt in the form of a continuous loop, and which may be readily looped about a pair of rollers, one of which is a true cylinder, the other of which is deformed to conform with a workpiece and the belt stretched therebetween, presenting a deformed surface to the workpiece and a substantially planular true cylindrical pattern, and, when properly positioned and operated, will accurately transfer a design to a deformed or non-planular workpiece without any appreciable deformation of the design.

We claim:

1. The method of making a continuous, flexible transfer belt, comprising stretching a sleeve of flexible material about a mandrel, inserting such mandrel in a rotatable mold, placing a quantity of solidifiable gum material in the mold about the flexible material, while the gum material is in a liquid condition, subjecting the mandrel and mold to rotary movement to cause the gum material to be maintained under pressure and in contact with the flexible sleeve, until the gum material solidifies about the surface of the sleeve, and thereafter removing the gum material and sleeve as a unit from the rotatable mold and core.

2. The method of making a transfer member, comprising providing a flexible base, applying to said base a stretched, elastic member, said elastic member being narrower than said base, applying to said elastic member and base a layer of gum material, while maintaining the elastic member stretched, thereafter releasing the tension of the elastic member, thus providing a deformed transfer member.

3. The method of making a transfer member, comprising providing an elastic base, stretching said base, applying to said stretched base a stretched elastic member which is stretched to a greater extent than the base, applying to said elastic member and base a layer of gum material while maintaining both the elastic member and base stretched, thereafter releasing the tension on the elastic member and base, thus providing a deformed transfer member.

4. The method of making a transfer member, comprising placing a sleeve of flexible material on a cylindrical mandrel, placing a stretched cylindrical sleeve of elastic material on the first-named sleeve, said second-named sleeve being narrower than the first-named sleeves in its end, applying to said superposed sleeves a layer of transfer gum material, the external surface of which is parallel with said mandrel, thereafter removing said sleeves and material as a unit from the mandrel, thus forming a deformed transfer belt.

5. The method of making a transfer member, comprising stretching a sleeve of elastic material on a cylindrical mandrel, placing a second stretched cylindrical sleeve of elastic material on the first-named sleeve, said second-named sleeve being of such a diameter that it is stretched to a greater extent than the first sleeve when in position thereon, applying to said superposed stretched sleeves a layer of non-stretched transfer gum material, the external surface of which is parallel with said mandrel, thereafter removing said sleeves and material as a unit from the mandrel.

6. The method of making a continuous, flexible, transfer belt, comprising placing a sleeve of flexible material about a mandrel, applying to said sleeve a second sleeve, narrower than the first, and normally of a smaller diameter, whereby said second-named sleeve is stretched about the first-named sleeve, inserting said mandrel and sleeves in a rotary mold, placing a quantity of solidifiable gum material in the mold about said sleeves while such material is in a liquid condition, subjecting the mold, together with the mandrel and sleeves to a rotary movement about the axis of the mold, to cause the gum material to be maintained under pressure and in contact with the sleeves until the gum material solidifies about the surfaces thereof, and thereafter removing the gum material and sleeves as a unit from the rotatable mandrel and core.

7. The method of making a continuous, flexible, transfer belt, comprising stretching a sleeve of elastic material about a mandrel having a larger diameter than the normal diameter of the sleeve, applying to said sleeve a second sleeve, narrower than the first, and normally of a smaller diameter than the first sleeve, by stretching said sleeve about the first-named sleeve, whereby the second sleeve is stretched to a greater extent than the first sleeve, inserting said mandrel and sleeves in a rotatable mold, placing a quantity of solidifiable gum material in the mold about said sleeves while such material is in a liquid condition, subjecting the mold, the mandrel, the sleeves and material to a common rotary movement about the axis thereof, to cause the gum material to be maintained under pressure and in contact with the sleeves until the gum material solidifies about the surface thereof, and thereafter removing the gum material and sleeves as a unit from the rotatable mold and mandrel.

8. The method of forming a deformed transfer member, comprising providing a true cylindrical annular sleeve, applying to such sleeve a stretched, elastic sleeve, having a normal diameter smaller than the diameter of the first-named sleeve, but stretched to the external diameter of the first-named sleeve, applying to said superposed sleeve a layer of transfer gum material, thereafter permitting the unit to contract under the influence of the second-named sleeve, thereby providing a deformed transfer member.

9. The method of making a deformed transfer member, comprising providing a deformed elastic sleeve, stretching said sleeve about a true cylindrical surface, applying to such stretched sleeve an even layer of gum material, thereafter removing the gum material and sleeve as a unit from the cylindrical surface.

10. The method of forming a deformed elastic transfer member, comprising providing a deformed elastic sleeve, placing such sleeve upon a cylinder deformed in substantially the same manner as such sleeve, thereafter applying to said sleeve a coating of gum material, thereafter removing the gum material sleeve as a unit from the core.

11. The method of making a deformed transfer member, comprising providing a deformed sleeve, stretching said sleeve about a cylindrical core which is deformed to a lesser extent than the sleeve, applying to said sleeve a coating of gum material while maintaining the sleeve stretched about said core, thereafter stripping said gum material and sleeve from the core as a unit.

12. The method of making a substantially hour-glass shaped continuous band of transfer loop, comprising providing a cylindrical sleeve of elastic material, applying said sleeve in a substantially normal condition to a cylinder, applying a comparatively narrow sleeve to said first-named sleeve, said narrow sleeve being normally of a smaller diameter than the first-named sleeve and in a stretched condition when positioned on said cylinder, applying to the said superposed sleeve a layer of transfer gum material, the surface of such material being substantially parallel with the surface of such cylinder, and thereafter stripping said material and sleeve as a unit from the cylinder, thus permitting the tension of the second sleeve to deform the transfer member.

13. The method of making a substantially hour-glass shaped continuous band of transfer belt, comprising providing a cylindrical sleeve of elastic rubber material, applying said rubber sleeve in a substantially normal, unstretched condition to a cylinder, applying a comparatively narrow, elastic rubber sleeve to said first-named sleeve, said narrow sleeve being normally of a smaller diameter than the first-named sleeve, and in a stretched condition when positioned on the cylinder, applying to the said superposed sleeve a layer of glue and glycerin compound, the surface of such compound being substantially parallel with the surface of the cylinder and thereafter stripping said compound and sleeves as a unit from the cylinder, thus permitting the tension of the narrow rubber sleeve to deform the transfer member.

LLOYD V. CASTO.
GUIDO VON WEBERN.
EDWARD WILLIAM HAMANT.